(12) United States Patent
Ting et al.

(10) Patent No.: US 6,922,183 B2
(45) Date of Patent: Jul. 26, 2005

(54) MULTI-DOMAIN VERTICAL ALIGNMENT LIQUID CRYSTAL DISPLAY AND DRIVING METHOD THEREOF

(76) Inventors: Chin-Lung Ting, 10Fl., No. 148, Sec. 2, Fushing S. Rd., Daan Chiu, Taipei 106 (TW); Wen-Fu Huang, No. 1, Chi-Yeh Rd., Tainan County (TW)

( * ) Notice: Subject to any disclaimer, the term of this patent is extended or adjusted under 35 U.S.C. 154(b) by 212 days.

(21) Appl. No.: 10/285,412

(22) Filed: Nov. 1, 2002

(65) Prior Publication Data

US 2004/0085272 A1 May 6, 2004

(51) Int. Cl.⁷ ............................................ G09G 3/36
(52) U.S. Cl. ..................... 345/87; 345/30; 345/54; 345/55; 345/84; 345/87; 345/95; 345/96; 345/97; 349/123; 349/144
(58) Field of Search ............................. 345/30, 54, 55, 345/84, 87, 95–97; 349/123, 144

(56) References Cited

U.S. PATENT DOCUMENTS

| 4,368,523 | A | * | 1/1983 | Kawate ........................ 365/63 |
| 5,351,145 | A | * | 9/1994 | Miyata et al. .................. 349/48 |
| 5,576,863 | A | * | 11/1996 | Aoki et al. ................... 349/124 |
| 6,583,841 | B2 | * | 6/2003 | Youn et al. ................... 349/141 |
| 6,756,953 | B1 | * | 6/2004 | Tokioka et al. ................ 345/87 |
| 2002/0113929 | A1 | * | 8/2002 | Yamazaki et al. ........... 349/123 |

* cited by examiner

Primary Examiner—Sumati Lefkowitz
Assistant Examiner—Alexander S. Beck
(74) Attorney, Agent, or Firm—Rabin & Berdo, P.C.

(57) ABSTRACT

A multi-domain vertical alignment (MVA) liquid crystal display (LCD), including a first substrate and a second substrate, a common electrode, a number of pixel electrodes, a number of first switches and second switches, and liquid crystals (LCs). The common electrode is formed on one surface of the first substrate. The pixel electrodes are formed on a surface of the second substrate and are opposite to the common electrode. Each of the pixel electrodes includes a slit and a first sub-pixel electrode and a second sub-pixel electrode which are electrically isolated to each other by the slit. Each of the first switches is used for controlling corresponding first sub-pixel electrode, and each of the second switches is used for controlling corresponding second sub-pixel electrode. The liquid crystals (LCs) are sealed between the first substrate and the second substrate. The first and second sub-pixel electrodes of one of the pixel electrodes incline the liquid crystals in the proximity of the slit when the corresponding first and the second switches are enabled and data signals of opposite polarities are respectively applied to the first sub-pixel electrode and the second sub-pixel of the one of the pixel electrode.

13 Claims, 13 Drawing Sheets

MULTI-DOMAIN VERTICAL ALIGNMENT LIQUID CRYSTAL DISPLAY AND DRIVING METHOD THEREOF

BACKGROUND OF THE INVENTION

1. Field of the Invention

The invention relates in general to a multi-domain vertical alignment (MVA) liquid crystal display (LCD), and more particularly to an MVA thin-film transistor (TFT) LCD with sub-pixel electrodes driven by data signals in different electrical polarities.

2. Description of the Related Art

Recently, the MVA LCD has attracted a lot of interest because of its characteristics, such as superior viewing angle and high display quality. A cross-sectional view of a first conventional MVA LCD is illustrated in FIG. 1A. An electrode 2a is formed on a substrate 1a, and projection patterns 3a formed of insulating material are formed on the electrode 2a. The electrode 2a and the projection patterns 3a are covered with a vertical alignment film 4a. An electrode 2b is formed on another substrate 1b, and projection patterns 3b formed of insulating material are formed under the electrode 2b. The electrode 2b and the projection patterns 3b are covered with a vertical alignment film 4b.

Due to the projection patterns 3a and 3b, some of the liquid crystal molecules 5 are oriented perpendicularly, while others, especially those over the projection patterns 3a and 3b, are tilted at an angle with respect to the surface of the alignment film when no voltage is applied across electrodes 2a and 2b. When the voltage is applied across electrodes 2a and 2b, the liquid crystal molecules 5 located near the projection patterns 3a and 3b may affect the inclinations of the liquid crystal molecules 5 apart from the projection patterns 3a and 3b. That is, the liquid crystal molecules 5 are inclined oppositely on both sides of the projecting patterns 3a and 3b. In this way, the liquid crystal molecules 5 automatically are divided into two re-orientation statuses to create two domains with opposite viewing characteristics; thus, MVA LCD with wide viewing angles is obtained.

The projection patterns 3b can be replaced by slits 6, as shown in FIG. 1B. The electrode 2b in FIG. 1A is divided into electrodes 2b' and 2b" in FIG. 1B, wherein the electrodes 2b' and 2b" are electrically connected and supplied with the same voltage. Since the direction of the electric field in the neighborhood of the slits 6 is slightly inclined (as dotted lines shown in FIG. 1B) with respect to surfaces of the electrodes 2b' and 2b" when a voltage is applied to both the electrodes 2b' and 2b", the liquid crystal molecules 5 near the slits 6 are inclined to different directions. Thus, two domains are formed as the LCD shown in FIG. 1B.

Unfortunately, the intensity of the lateral field between the electrodes 2b' and 2b" are insufficient because the electrodes 2b' and 2b" are electrically connected, and supplied with the same voltage. That is, the electric field which inclines the LC molecules is not strong enough to affect the re-orientation effectively. As a result, the response time of the LC molecules is poor and can not be reduced effectively.

SUMMARY OF THE INVENTION

It is therefore an object of the invention to provide a multi-domain vertical alignment (MVA) liquid crystal display (LCD) for reducing the response time of the liquid crystals. In addition, flicker phenomenon of the MVA LCD is improved and driving power consumption of the MVA LCD is reduced.

It is another object of the invention to provide a multi-domain vertical alignment (MVA) liquid crystal display (LCD), including a first substrate and a second substrate, a common electrode, a number of pixel electrodes, a number of first switches and second switches, and liquid crystals (LCs). The common electrode is formed on one surface of the first substrate. The pixel electrodes are formed on a surface of the second substrate and are opposite to the common electrode. Each of the pixel electrodes includes a slit and a first sub-pixel electrode and a second sub-pixel electrode which are electrically isolated to each other by the slit. Each of the first switches is used for controlling corresponding first sub-pixel electrode, and each of the second switches is used for controlling corresponding second sub-pixel electrode. The liquid crystals (LCs) are sealed between the first substrate and the second substrate. The first and second sub-pixel electrodes of one of the pixel electrodes incline the liquid crystals in the proximity of the slit when the corresponding first and the second switches are enabled and data signals of opposite polarities with respect to the voltage of the common electrode are respectively applied to the first sub-pixel electrode and the second sub-pixel of the one of the pixel electrode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
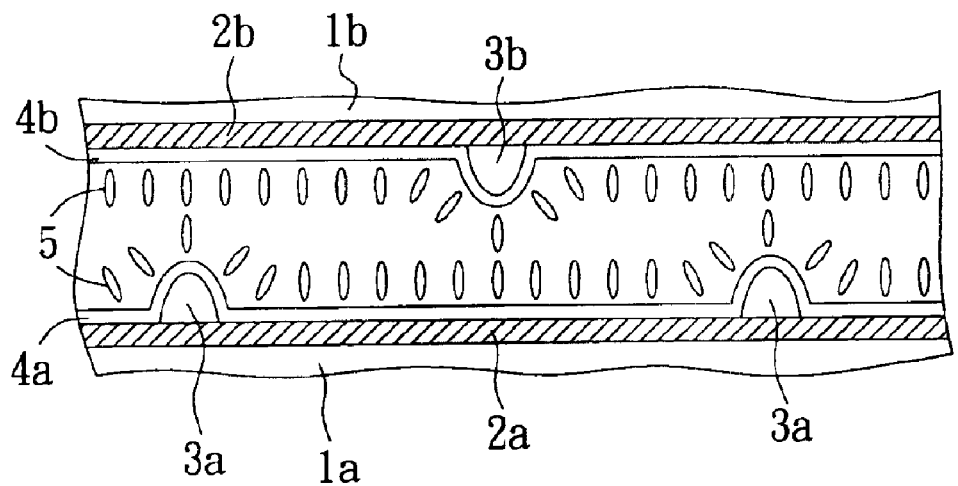
FIGS. 1A and 1B illustrate cross-sectional views of a first and a second conventional MVA LCD.
Figure 1B:
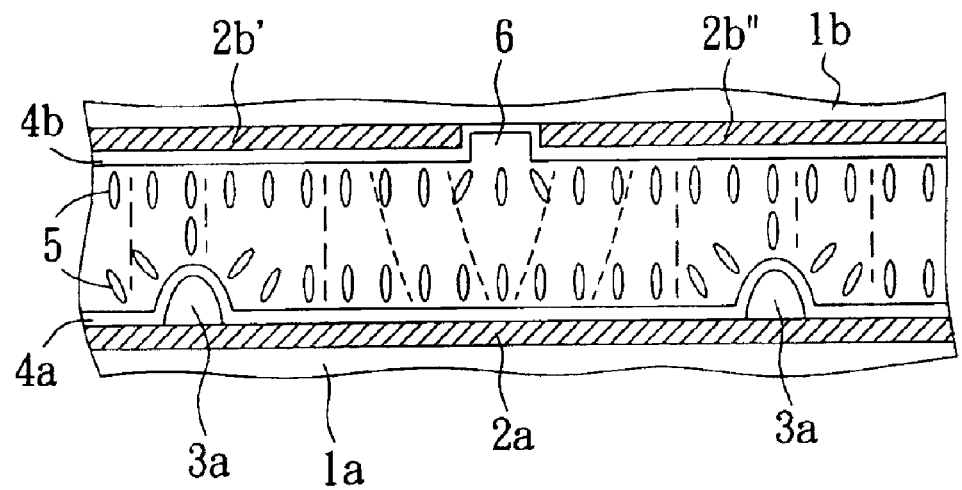
Figure 2:
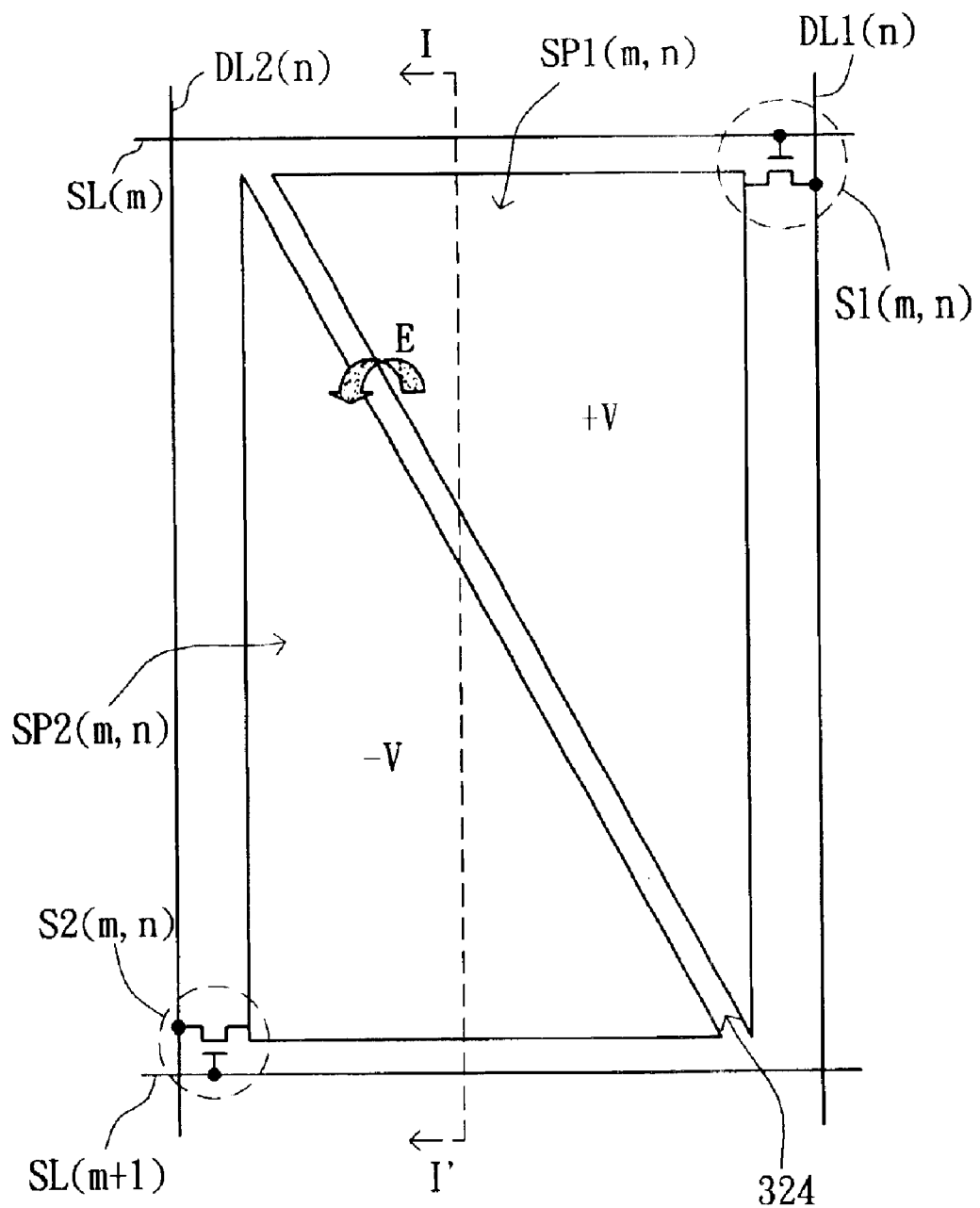
FIG. 2 illustrates a cross-sectional view of an MVA LCD according to a first embodiment of invention.

Referring to FIG. 2, a cross-sectional view of an MVA LCD according to a first embodiment of invention is illustrated. According to the spirit of the invention, a pixel P(m, n) is divided into two sub-pixels. That is, a pixel electrode for the pixel P(m, n) is divided into two sub-pixel electrodes, including a first sub-pixel electrodes SP1(m, n) and a second sub-pixel electrodes SP2(m, n). The sub-pixel electrodes SP1(m, n) and SP2(m, n) are electrically isolated to each other by a slit 324. The first and second sub-pixel electrodes SP1(m, n) and SP2(m, n) are controlled by two switches, such as the first thin-film transistor (TFT) S1(m, n) and the second TFT S2(m, n), respectively. The gates of the TFTs S1(m, n) and S2(m, n) are connected to scan lines SL(n) and SL(m+1) respectively, and the drains of the TFTs S1(m, n) and S2(m, n) are connected to data lines DL1(n) and DL2(n) respectively.

Figure 3:
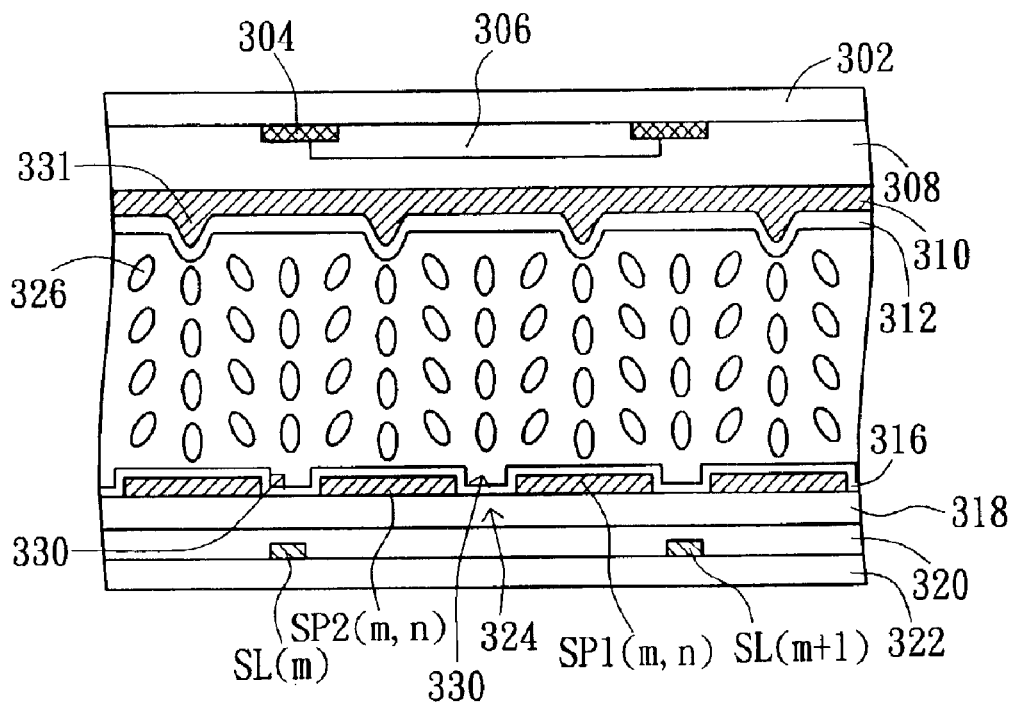
FIG. 3 shows a cross-sectional view of the MVA LCD in FIG. 2 along I–I'.
Figure 4:
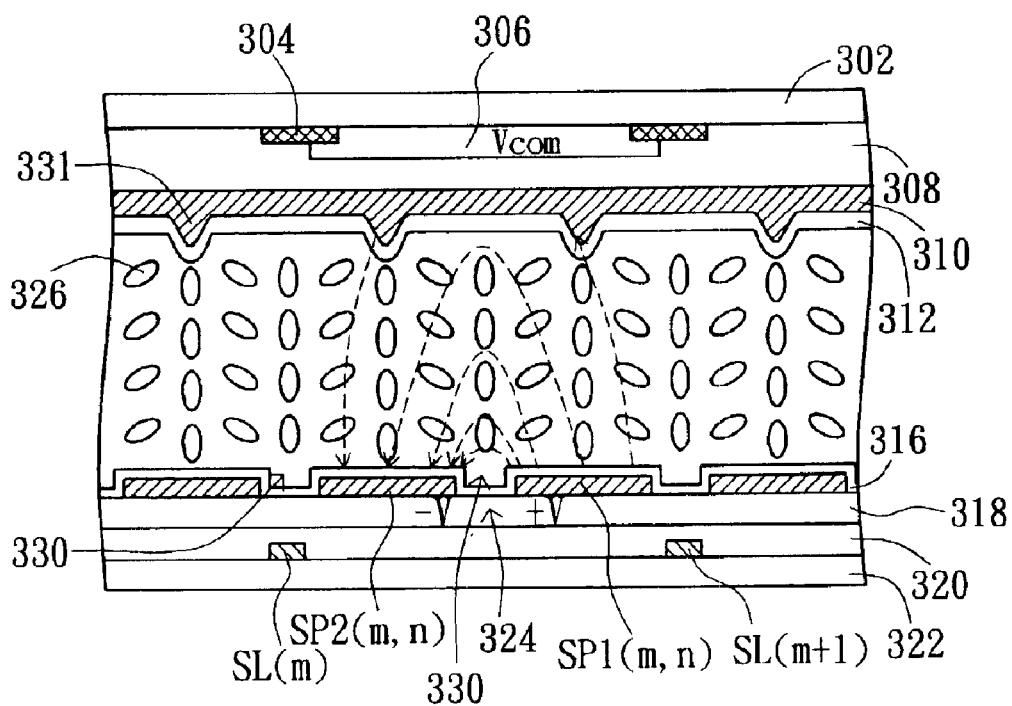
FIG. 4 shows a cross-sectional view of the MVA LCD in which the pixel is driven by applying data signals in opposite electrical polarities to the sub-pixel electrodes according to a first embodiment of invention.

A cross-sectional view of the MVA LCD in FIG. 2 along I–I' is shown in FIG. 3. The MVA LCD includes a first substrate 302, a second substrate 322, and liquid crystals 326. A black matrix 304 and color filter 306 are formed on a surface of the first substrate 302, which are covered by an insulting layer 308. A common electrode 310 is formed on the insulting layer 308, and is covered by a vertical alignment film 312. In addition, the scan lines SL(m) and SL(m+1) are formed on a surface of the second substrate 322 which is opposite to the common electrode 310 and covered by an insulating layer 320. The data lines DL(n) (not shown) are formed on the second insulating layer 320, and covered by an insulating layer 318. The sub-pixel electrodes SP1(m, n) and SP2(m, n) are formed on the insulating layer 318 and covered by a vertical alignment film 316. The liquid crystals 326 are sealed between the first substrate 302 and the second substrate 322. When no voltages are applied to the sub-pixel electrodes SP1(m, n) and SP2(m, n), the liquid crystals 326 are substantially aligned perpendicular to the substrates 302 and 322, as shown in FIG. 3 except those near the slits 330 and the projection patterns 331.

Referring to FIG. 2, a cross-sectional view of an MVA LCD according to a first embodiment of invention is illustrated. According to the spirit of the invention, a pixel P(m, n) is divided into two sub-pixels. That is, a pixel electrode for the pixel P(m, n) is divided into two sub-pixel electrodes, including a first sub-pixel electrodes SP1(m, n) and a second sub-pixel electrodes SP2(m, n). The sub-pixel electrodes SP1(m, n) and SP2(m, n) are electrically isolated to each other by a slit 324. The first and second sub-pixel electrodes SP1(m, n) and SP2(m, n) are controlled by two switches, such as the first thin-film transistor(TFT) S1(m, n) and the second TFT S2(m, n), respectively. The gates of the TFTs S1(m, n) and S2(m, n) are connected to scan lines SL(m) and SL(m+1) respectively, and the drains of the TFTs S1(m, n) and S2(m, n) are connected to data lines DL1(n) and DL2(n) respectively.

A cross-sectional view of the MVA LCD in FIG. 2 along I–I' is shown in FIG. 3. The MVA LCD includes a first substrate 302, a second substrate 322, and liquid crystals 326. A black matrix 304 and color filter 306 are formed on a surface of the first substrate 302, which are covered by an insulating layer 308. A common electrode 310 is formed on the insulating layer 308, and is covered by a vertical alignment film 312. In addition, the scan lines SL(m) and SL(m+1) are formed on a surface of the second substrate 322 which is opposite to the common electrode 310 and covered by an insulating layer 320. The data lines DL(n) (not shown) are formed on the second insulating layer 320, and covered by an insulating layer 318. The sub-pixel electrodes SP1(m, n) and SP2(m, n) are formed on the insulating layer 318 and covered by a vertical alignment film 316. The liquid crystals 326 are sealed between the first substrate 302 and the second substrate 322. When no voltages are applied to the sub-pixel electrodes SP1(m, n) and SP2(m, n), the liquid crystals 326 are substantially aligned perpendicular to the substrates 302 and 322, as shown in FIG. 3 except those near the slits 330 and the projection patterns 331.

According to the spirit of the invention, the pixel P(m, n) is driven by applying data signals in opposite electrical polarities to the sub-pixel electrode SP1(m, n) and SP2(m, n) through the enabled TFTs S1(m, n) and S2(m, n)(not shown in FIG. 3). The voltage applied to the common electrode 310 is referred to as a common voltage Vcom. Voltage above the common voltage Vcom is defined as positive electrical polarity voltage, while voltage below the common voltage Vcom is defined as negative electrical polarity voltage. When the pixel P(m, n) is selected, the TFTs S1(in, n) and S2(m, n) are enabled, and data signals with positive electrical polarity voltage +V and negative electrical polarity voltage −V are applied to the sub-pixel electrodes SP1(m, n) and SP2(m, n) individually. In addition, the difference between the positive electrical polarity voltage +V and the common voltage Vcom and the difference between the common voltage and the negative electrical polarity voltage −V are substantially equal for displaying the same gray level in the two sub-pixels.

Figure 5A:
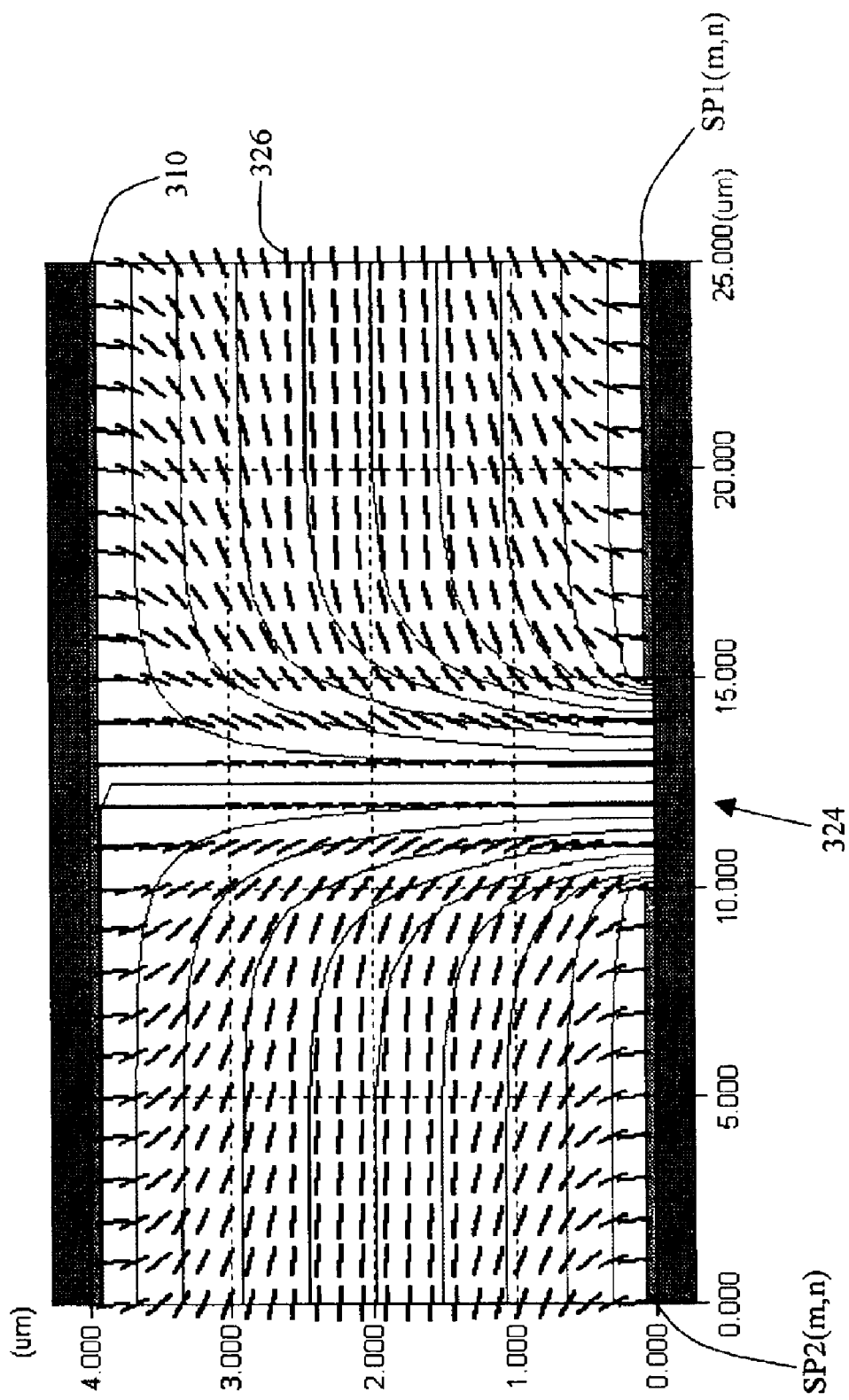
FIGS. 5A, 5B, and 5C show the simulation result when voltages are applied to the common electrode, the first sub-pixel electrode, and the second sub-pixel electrode.
Figure 5B:
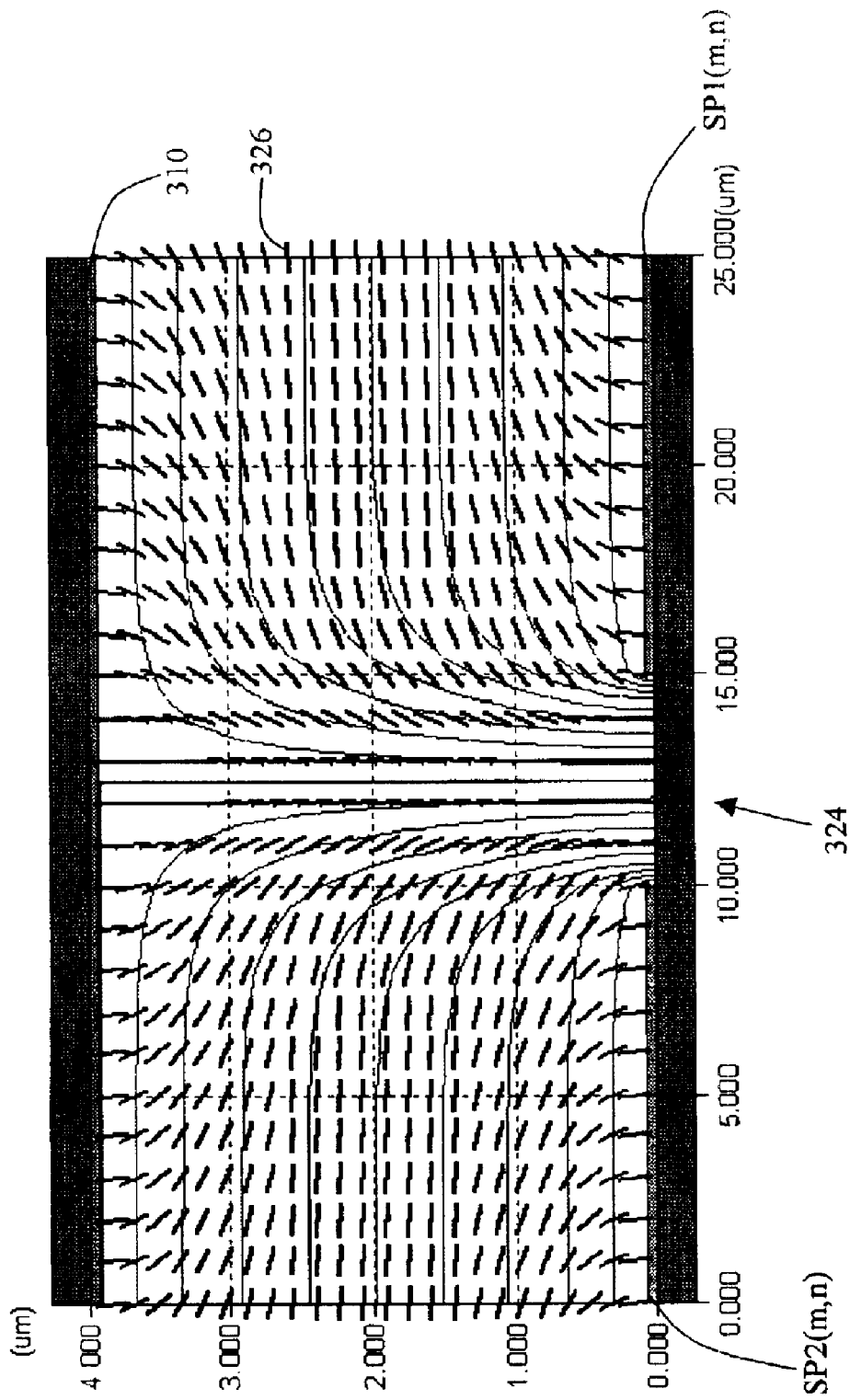
Figure 5C:
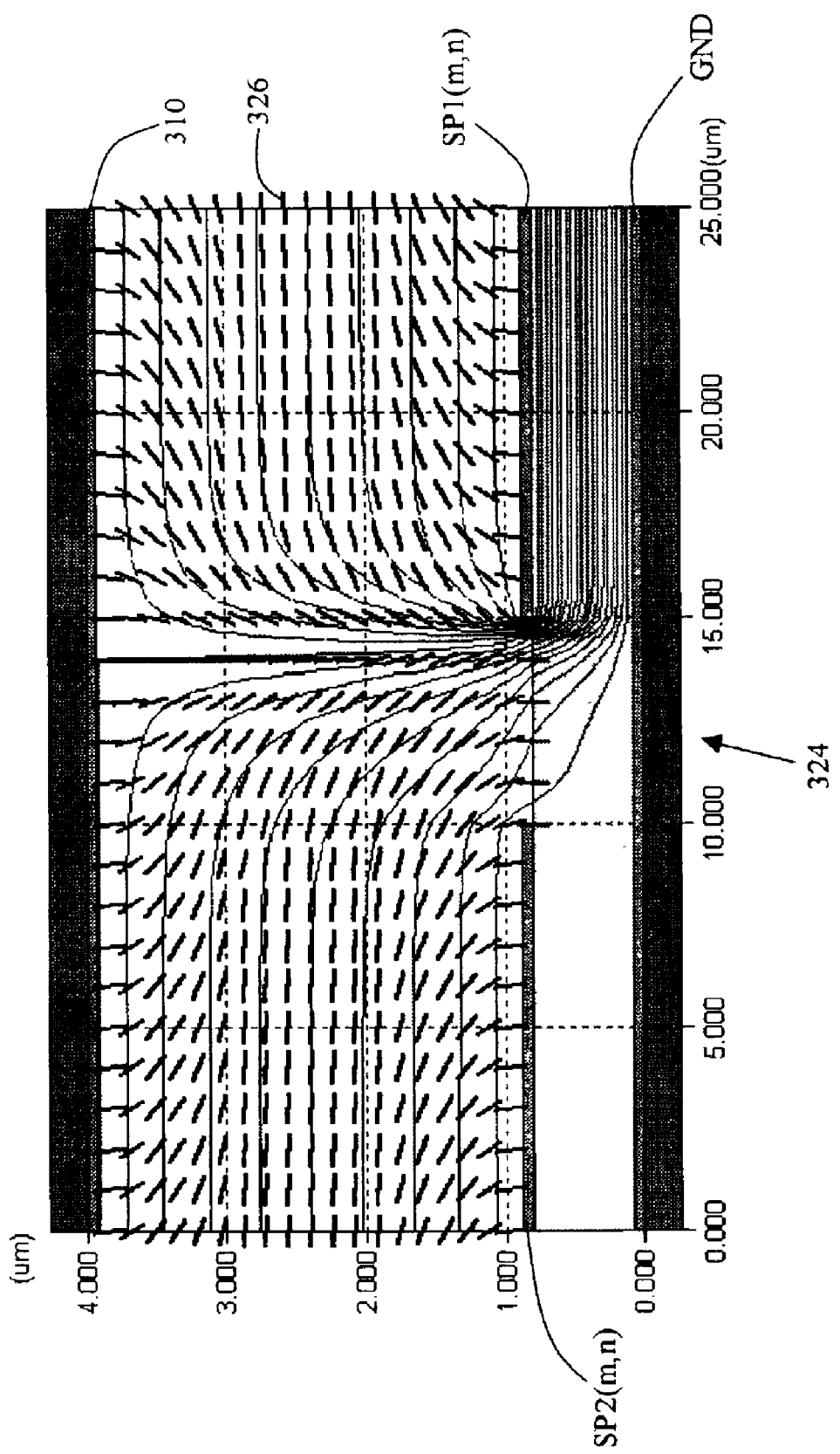

FIGS. 5A, 5B, and 5C show the simulation result when voltages are applied to the common electrode 306, the first sub-pixel electrode SP1(m, n), and the second sub-pixel electrode SP2(m, n). The curves in FIGS. 5A, 5B, and 5C represent the equipotential lines corresponding to different conditions. In FIG. 5A, the common electrode 310, the first sub-pixel electrode SP1(m, n), and the second sub-pixel electrode SP2(m, n) are supplied with the voltages of 0V, +5V, and −5V, respectively. As anticipated, the liquid crystals 326 automatically divide into two LC re-orientations to create two domains.

In FIG. 5B, the common electrode 310, the first sub-pixel electrode SP1(m, n), and the second sub-pixel electrode SP2(m, n) are supplied with the voltages of +5V, +10V, and 0V, respectively. In FIG. 5A, the ground reference voltage level is set to be in the infinite, and the slit 324 is viewed as being floating. In this condition, the liquid crystals 326 also divide into two LC re-orientations, and two domains are created.

FIGS. 5A, 5B, and 5C show the simulation result when voltages are applied to the common electrode 310, the first sub-pixel electrode SP1(m, n), and the second sub-pixel electrode SP2(m, n). The curves in FIGS. 5A, 5B, and 5C represent the equipotential lines corresponding to different conditions. In FIG. 5A, the common electrode 310, the first sub-pixel electrode SP1(m, n), and the second sub-pixel electrode SP2(m, n) are supplied with the voltages of 0V, +5V, and −5V, respectively. As anticipated, the liquid crystals 326 automatically divide into two LC re-orientations to create two domains.

However, the ground reference voltage level in practice is far away from the first and second sub-pixel electrodes SP1(m, n) and SP2(m, n), so the situation shown in FIG. 5C would not happen when the common voltage Vcom is chosen to be non-zero, for example, 5V. Therefore, when voltages are applied to the common electrode 310, the first and second sub-pixel electrodes SP1(m, n) and SP2(m, n), the distribution of the electrical field is symmetric as shown in FIG. 5B, and two domains with opposite viewing characteristics are created.

Figure 6:
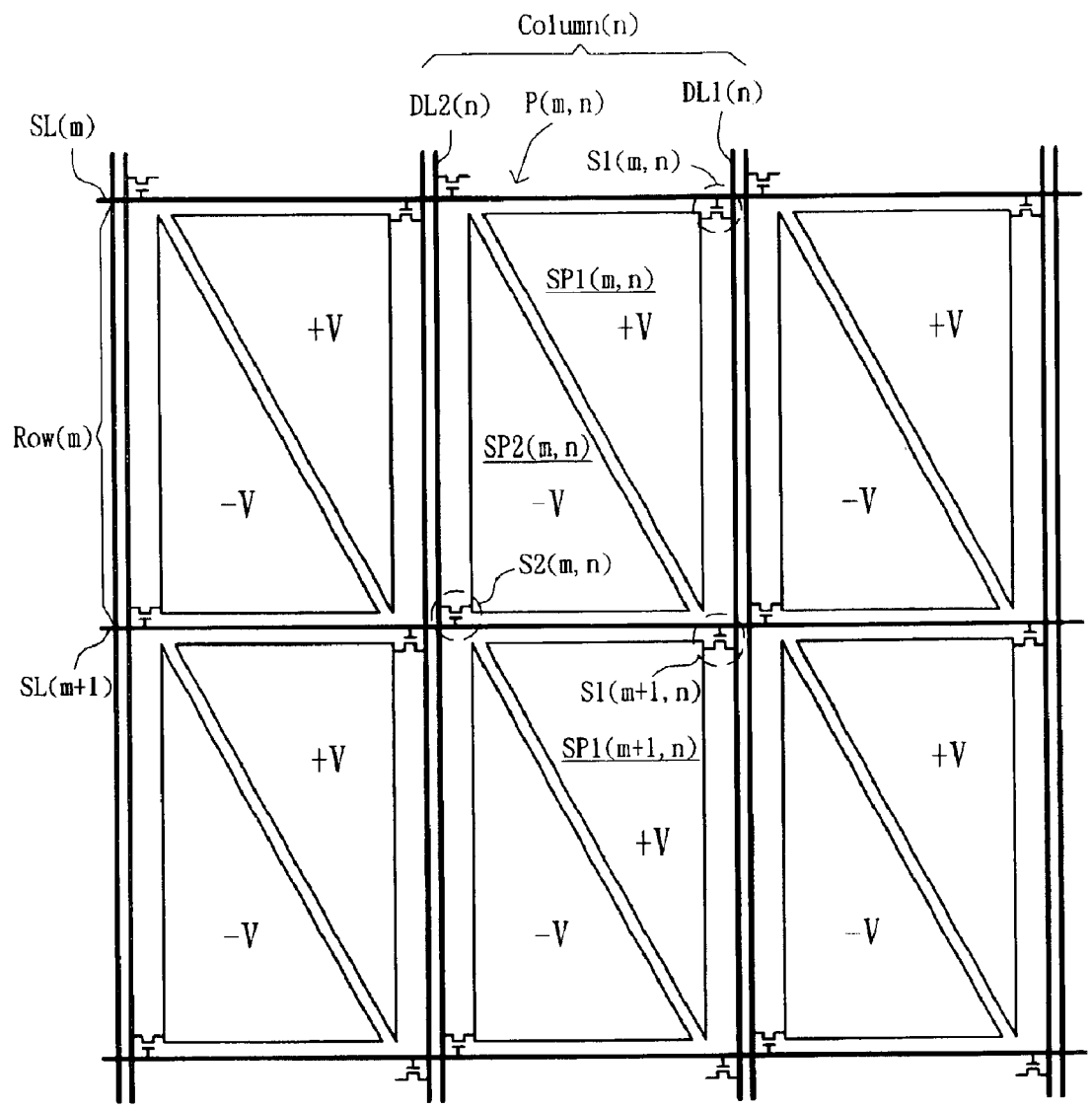
FIG. 6 illustrates a pixel array of the MVA LCD in FIG. 2 according to a first embodiment of the invention, wherein each pixel is driven by double data lines.

Referring to FIG. 6, a pixel array of the MVA LCD in FIG. 2 is illustrated, wherein each pixel is driven by double data lines. As mentioned above, the sub-pixel electrodes SP1(m, n) and SP2(m, n) are controlled respectively by the TFTs S1(m, n) and S2(m, n), while the gates of the TFTs S1(m, n) and S2(m, n) are connected to scan lines SL(m) and SL(m+1) respectively, and the drains of the TFTs S1(m, n) and S2(m, n) are connected to data lines DL1(n) and DL2(n) respectively. In the first embodiment, a pair of data lines can be electrically coupled to the first sub-pixel electrodes and the second sub-pixel electrodes of one column of pixel electrodes, respectively. Take the pixels in column(n) for example, all of the first sub-pixel electrodes in column(n) are electrically coupled to data line DL1(n), and all of the second sub-pixel electrodes in column(n) are electrically coupled to data line DL2(n). Besides, the second sub-pixel electrodes of one row and the first sub-pixel electrodes of the next row are electrically connected to one scan line, for example, the sub-pixel electrodes SP2(m, n) and SP1(m+1, n) are both connected to the scan line SL(m+1).

When the pixels of the MVA LCD in FIG. 6 are driven. the scan lines, are selected and driven sequentially. The corresponding data signals are applied to the first sub-pixels electrodes and the second sub-pixel electrodes when the corresponding first and second TFTs are enabled sequentially by sequentially driven scan lines. For example, when scan line SL(m+1) is selected, the TFTs S2(m, n) and S1(m+1,n) are enabled, and the corresponding data signals are applied to the sub-pixel electrodes SP2(m, n) and SP1(m+1,n) through data lines DL2(n) and DL1(n) respectively.

The driving method used in the invention is referred to as a sub-pixel inversion driving method. The sub-pixel inversion driving method used in FIG. 6 is similar to column inversion driving method. In this embodiment, sub-pixel electrodes in the same column are supplied with data signals of the same electrical polarity. For example, sub-pixel electrodes SP1(m, n) and SP1(m+1,n) are supplied with data signals of positive electrical polarity through data lines DL1(n) while sub-pixel electrodes SP2(m, n) and SP2(m+1, n) are supplied with data signals of negative electrical polarity. Therefore, data signals applied into data line DL1 (n) are all of positive electrical polarity while data signals applied into data line DL2(n) are all of negative electrical polarity when all scan lines are scanned during one frame period. Consequently, driving power consumption of driving circuit can be reduced in the sub-pixel inversion driving method, as compared with the conventional dot inversion driving method. In addition, the flicker phenomenon is also further lessened.

Moreover, dot defect prevention is provided in the MVA LCD according to the invention, which is superior to the conventional one. Because one pixel is divided into two sub-pixels, even if one sub-pixel is failed, the other sub-pixel may still work properly. Thus, the failure probability of one pixel is reduced.

Figure 7:
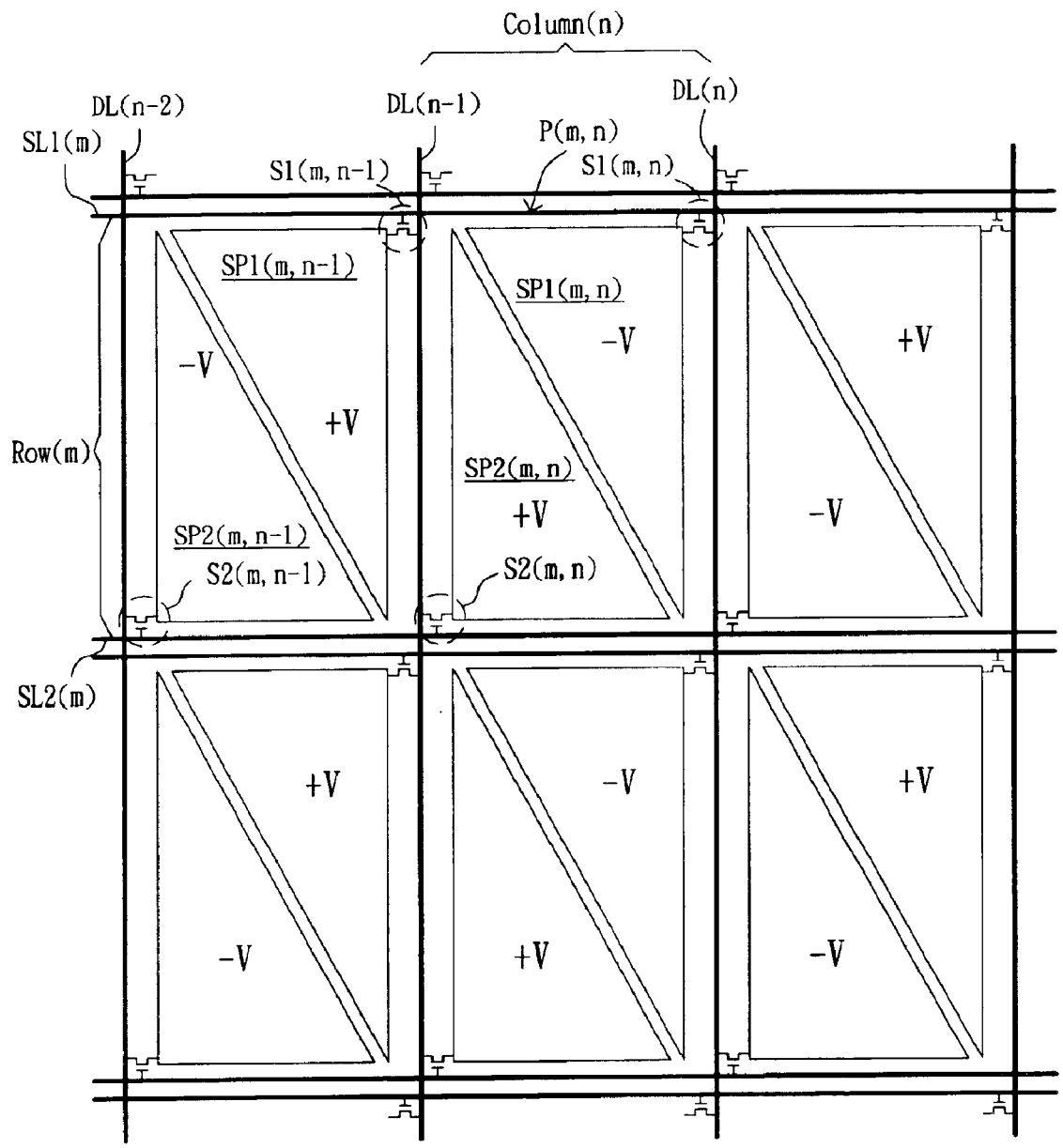
FIG. 7 illustrates a pixel array of MVA LCD according to a second embodiment of the invention, wherein each pixel is driven by two scan lines.

In FIG. 7, a pixel array of MVA LCD according to a second embodiment of the invention is illustrated, wherein each pixel is driven by two scan lines. In the second embodiment, a pair of scan lines is electrically coupled to the first sub-pixel electrodes and the second sub-pixel electrodes of one row of the pixel electrodes. Take the pixels in row(m) for example, all of the first sub-pixel electrodes in row(m) are electrically coupled to scan line SL1(m), and all of the second sub-pixel electrodes in row(m) are electrically coupled to scan line SL2(m). Besides, one column of the first sub-pixel electrodes and the next column of second sub-pixel electrodes are electrically coupled to one data line. For example, the sub-pixel electrodes SP2(m, n) and SP1(m, n−1) are both connected to the data line DL(n−1).

When the pixels of the MVA LCD in FIG. 7 are driven, each scan lines are scanned one by one; that is, the rows of the first TFTs and the second TFTs are enabled sequentially. The corresponding data signals are applied to the first sub-pixels electrodes and the second sub-pixel electrodes when the corresponding first and second TFTs are enabled respectively and sequentially. For example, when scan line SL1(m) is selected and the TFTs S1(m,n−1) and S1(m, n) are enabled, the corresponding data signals are applied to the sub-pixel electrodes SP1(m,n−1) and SP1(m, n) through data lines DL(n−1) and DL(n) respectively. After that, the scan line SL2(m) is selected and the TFTs S2(m,n−1) and S2(m, n) are enabled, and the corresponding data signals are then applied to the sub-pixel electrodes SP2(m,n−1) and SP2(m, n) through data lines DL(n−2) and DL(n−1) respectively. The sub-pixel inversion driving method used in FIG. 7 is similar to that used in FIG. 6, and will not be described again for simplicity.

Furthermore, data line coupling phenomenon is diminished in this embodiment. Take the data line DL(n−1) for example. The electrical polarities of data signals applied to the first and second sub-pixel electrodes SP1(m,n−1) and SP2(m, n) beside both sides of the data line DL(n−1) are set to be identical so that data line coupling phenomenon is reduced.

Figure 8A:
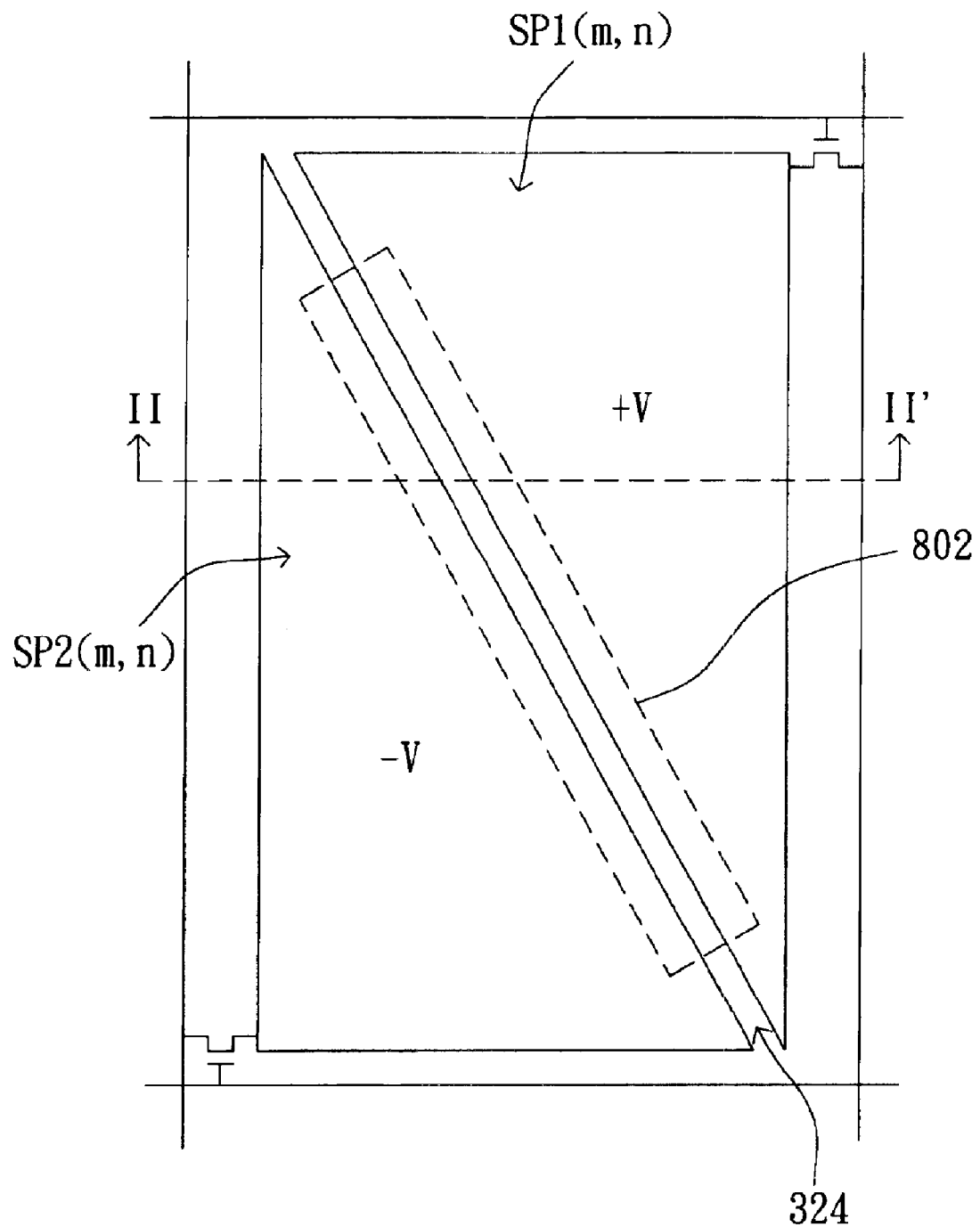
FIG. 8A illustrate a cross-sectional view of an MVA LCD with a storage capacitor electrode.

Referring to FIG. 8A, a schematic view of an MVA LCD with a storage capacitor electrode is illustrated. For maintaining high aperture ratio, the storage capacitor electrode 802 can be formed below the slit 324. The storage capacitor electrode 802 is larger than the slit 324 in width, and is overlapped by both the first sub-pixel electrode SP1(m, n) and the second sub-pixel electrode SP2(m, n). The storage capacitor electrode 802 can be electrically coupled to common voltage Vcom, and two storage capacitors are formed. One storage capacitor is formed between the first sub-pixel electrode SP1(m, n) and the storage capacitor electrode 802 and the other storage capacitor is formed between the storage capacitor electrode 802 and the second sub-pixel electrode SP2(m, n).

Figure 8B:
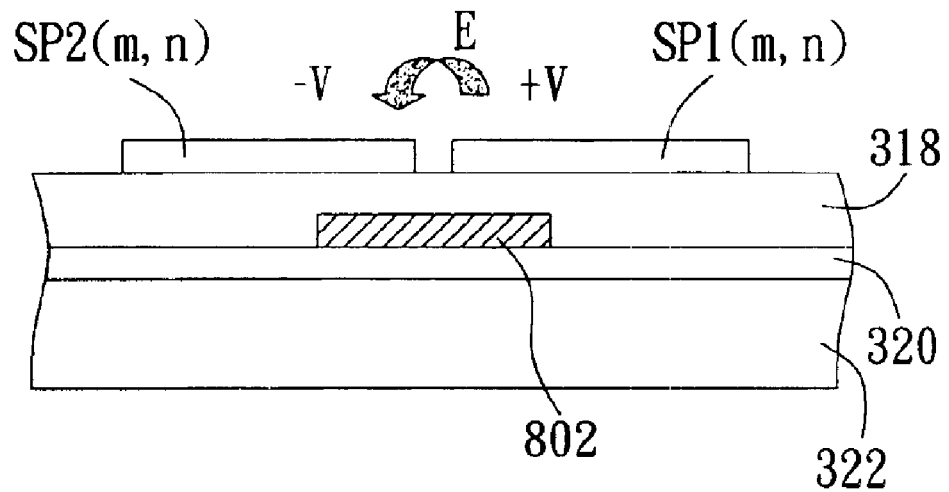
FIG. 8B and FIG. 8C illustrate a cross-sectional view of the MVA LCD with a storage capacitor electrode in FIG. 8A.
Figure 8C:
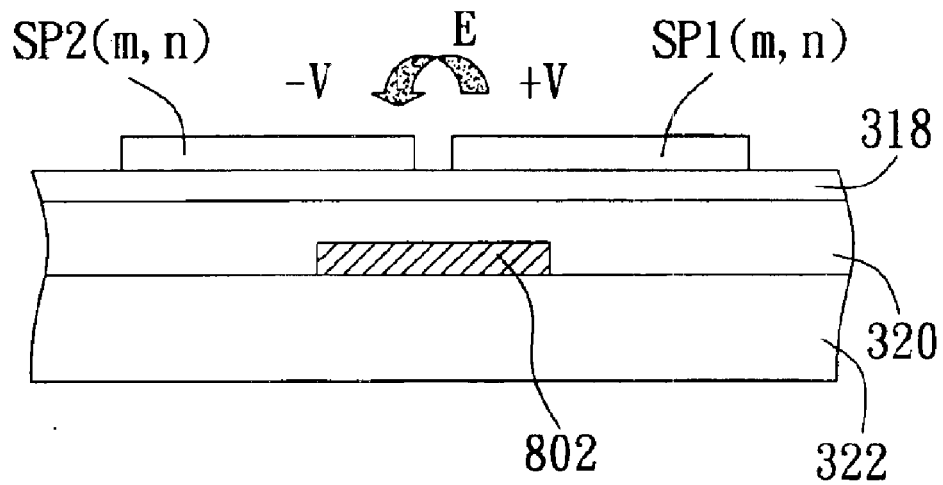

Referring to FIGS. 8B and 8C, a cross-sectional view of the MVA LCD with a storage capacitor electrode in FIG. 8A along II–II' is illustrated.

The storage capacitor electrode 802 can be formed, for example, during the scan line is formed, as shown in FIG. 8B, or during the data line is formed, as shown in FIG. 8C.

Figure 9A:
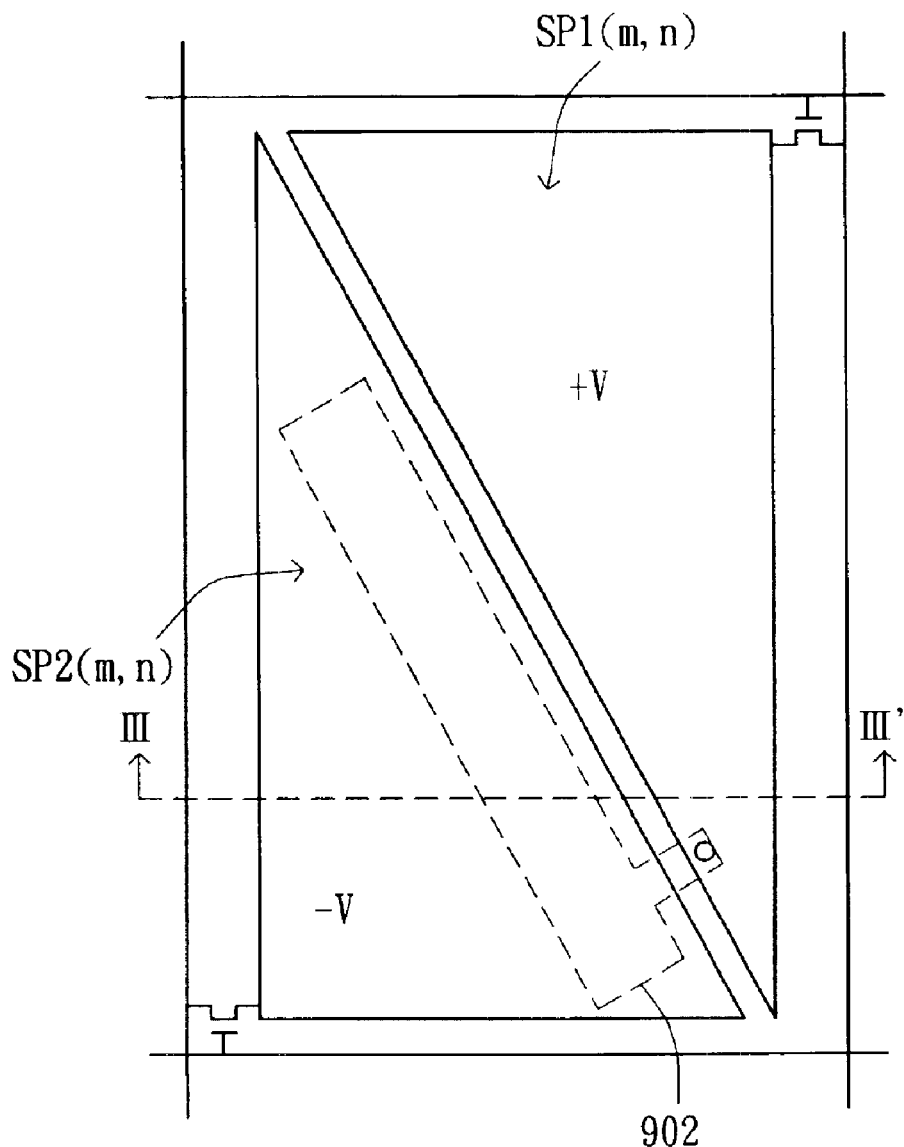
FIG. 9A and FIG. 9B respectively illustrate a schematic view and a cross-sectional view of an MVA LCD in which a storage capacitor electrode can be formed below the second sub-pixel electrode.
Figure 9B:
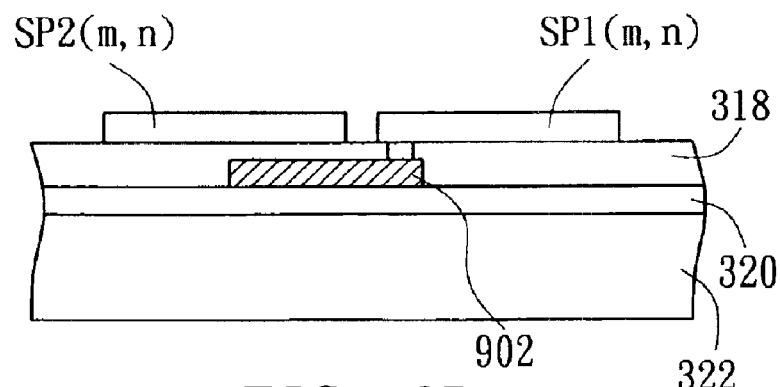

The storage capacitor electrode can still be formed in another way. A storage capacitor electrode 902 can be formed below the second sub-pixel electrode SP2(m, n) as shown in FIG. 9A and FIG. 9B, wherein a schematic view and a cross-sectional view of an MVA LCD along III–III' are illustrated respectively. The storage capacitor electrode 902 is electrically coupled to the first sub-pixel electrode SP1(m, n) while the storage capacitor electrode 902 and the second sub-pixel electrode SP2(m, n) form the storage capacitor. Further, the storage capacitor electrode 902 can be formed below the first sub-pixel electrode SP1(m, n) and electrically coupled to the second sub-pixel electrode SP2(m, n).

Figure 10A:
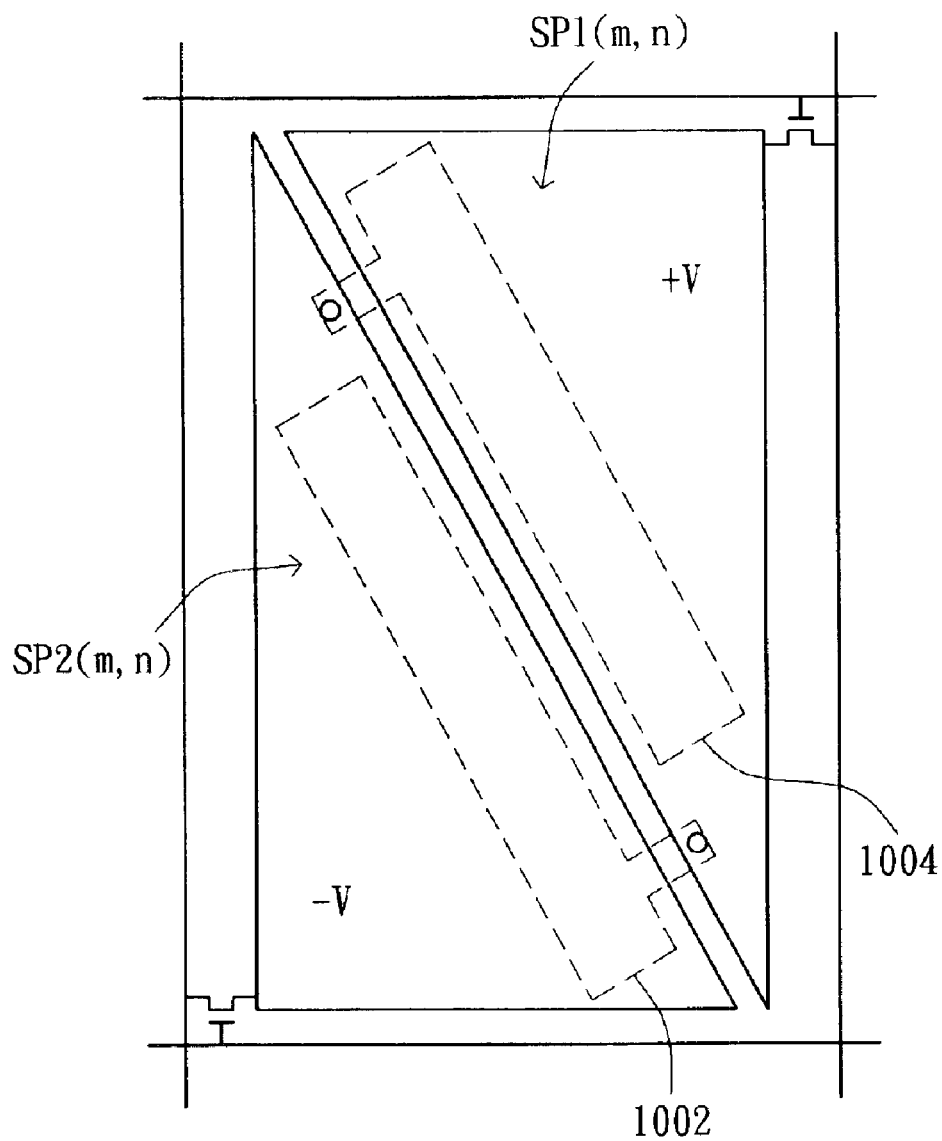
FIG. 10A and FIG. 10B respectively illustrate another cross-sectional view and the corresponding sectional drawing of an MVA LCD in which two storage capacitor electrodes are used.
Figure 10B:
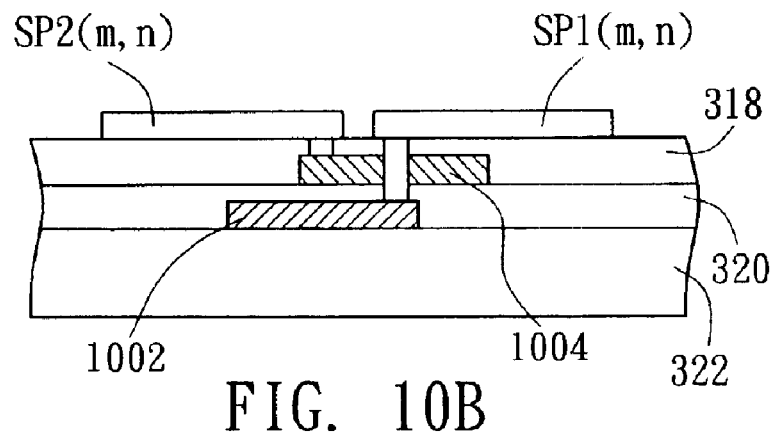

When two storage capacitor electrodes are used, they can be formed as shown in FIGS. 10A and 10B, which are still another schematic view and a sectional drawing of an MVA LCD respectively. A first storage capacitor electrode 1002 and a second storage capacitor electrode 1004 are formed below the second sub-pixel electrode SP2(m, n) and the first sub-pixel electrode SP1(m, n) respectively. The first storage capacitor electrode 1002 is electrically coupled to the first sub-pixel electrode SP1(m, n), and the second storage capacitor electrode 1004 is electrically coupled to the second sub-pixel electrode SP2(m, n). The first storage capacitor electrode 1002 and the second sub-pixel electrode SP2(m, n) form a first storage capacitor, and the second storage capacitor electrode 1004 and the first sub-pixel electrode SP1(m, n) form a second storage capacitor. In the structure shown in FIGS. 10A and 10B, the areas of the first and second storage capacitors are increased. Therefore, the capacitances of the first and second storage capacitors are increased.

Figure 11:
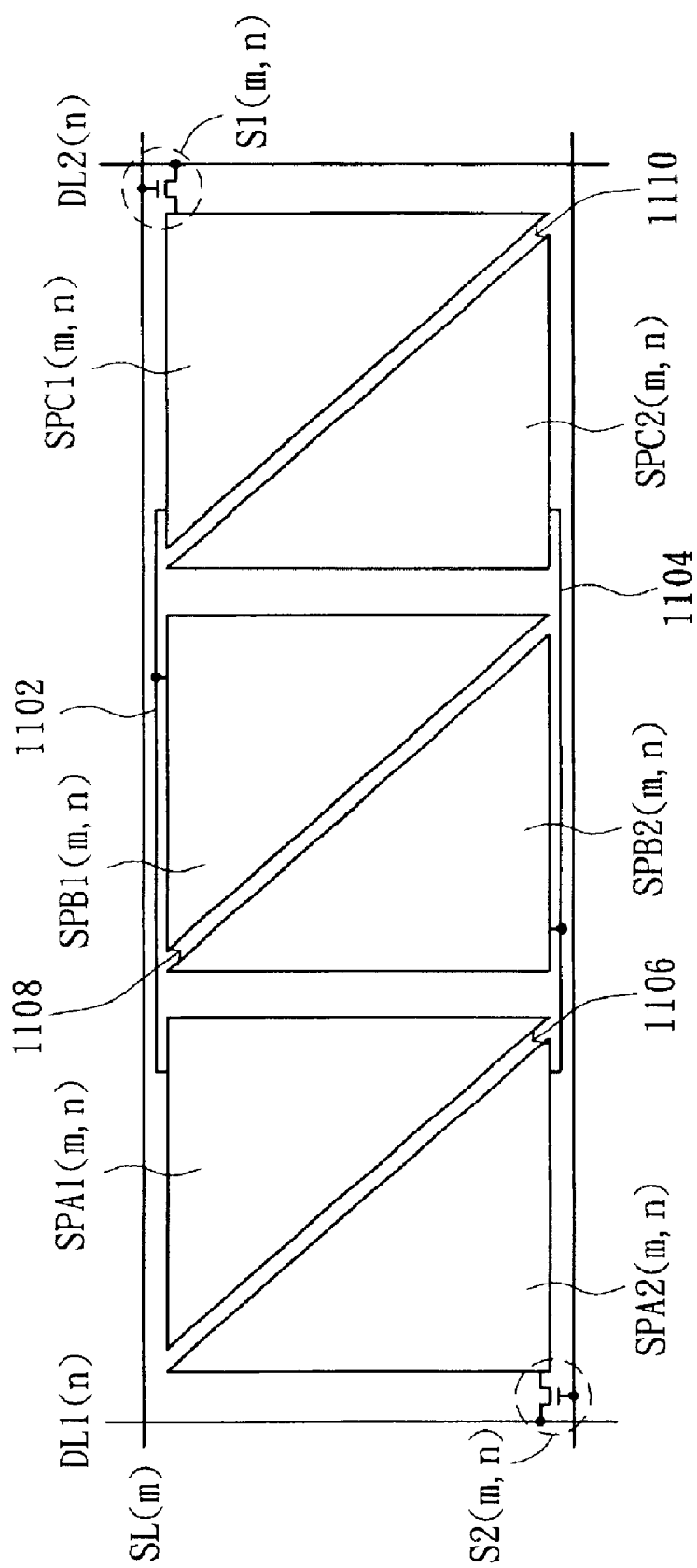
FIG. 11 illustrates a cross-sectional view of an MVA LCD according to a third embodiment of invention.

Referring to FIG. 11, a schematic view of an MVA LCD according to a third embodiment of invention is illustrated. In addition to having two sub-pixel electrodes in one pixel electrode, as disclosed in the first embodiment shown in FIG. 2, one pixel electrode can be divided into a number of sub-pixel electrodes as shown in FIG. 11 according to the invention. The pixel electrode is divided into two group of sub-pixel electrodes, wherein one group includes the sub-pixel electrodes SPA1(m, n), SPB1(m, n), and SPC1(m, n), and the other group includes the sub-pixel electrodes SPA2(m, n), SPB2(m, n), and SPC2(m, n). The sub-pixel electrodes SPA1(m, n) and SPA2(m, n) are electrical isolated by a slit 1106, the sub-pixel electrodes SPB1(m, n) and SPB2(m, n) are electrical isolated by a slit 1108, and the sub-pixel electrodes SPC1(m, n) and SPC2(m, n) are electrical isolated by a slit 1110. The slits 1106, 1108, and 1110 are preferable designed to have an included angle of 45 degree with respect to the scan line SL(n). The sub-pixel electrodes SPA1(m, n), SPB1(m, n), and SPC1(m, n) are electrically connected to a conductive line 1102, and all are controlled by the TFT S1(m, n). The sub-pixel electrodes SPA2(m, n), SPB2(m, n), and SPC2(m, n) are electrically connected to a conductive line 1104, and all are controlled by the TFT S2(m, n). The driving methods mentioned above are still suitable for the MVA LCD according to the third embodiment of the invention.

To sum up, the MVA LCD of the invention has the following advantages: first, the response time of the liquid crystals is reduced; second, the driving power consumption of the driving circuit can be reduced; third, the flicker phenomenon is lessened; fourth, the data line coupling phenomenon is diminished; and fifth, a superior dot defect prevention of MVA LCD according to the invention is achieved.

Referring to FIG. 11, a schematic view of an MVA LCD according to a third embodiment of invention is illustrated. In addition to having two sub-pixel electrodes in one pixel electrode, as disclosed in the first embodiment shown in FIG. 2, one pixel electrode can be divided into a number of sub-pixel electrodes as shown in FIG. 11 according to the invention. The pixel electrode is divided into two group of sub-pixel electrodes, wherein one group includes the sub-pixel electrodes SPA1(m, n), SPB1(m, n), and SPC1(m, n), and the other group includes the sub-pixel electrodes SPA2(m, n), SPB2(m, n), and SPC2(m, n). The sub-pixel electrodes SPA1(m, n) and SPA2(m, n) are electrical isolated by a slit 1106, the sub-pixel electrodes SPB1(m, n) and SPB2(m, n) are electrical isolated by a slit 1108, and the sub-pixel electrodes SPC1(m, n) and SPC2(m, n) are electrical isolated by a slit 1110. The slits 1106, 1108, and 1110 are preferable designed to have an included angle of 45 degree with respect to the scan line SL(m). The sub-pixel electrodes SPA1(m, n), SPB1(m, n), and SPC1(m, n) are electrically connected to a conductive line 1102, and all are controlled by the TFT S1(m, n). The sub-pixel electrodes SPA2(m, n), SPB2(m, n), and SPC2(m, n) are electrically connected to a conductive line 1104, and all are controlled by the TFT S2(m, n). The driving methods mentioned above are still suitable for the MVA LCD according to the third embodiment of the invention.

What is claimed is:

1. A multi-domain vertical alignment (MVA) liquid crystal display (LCD), comprising:
  a first substrate and a second substrate;
  a common electrode formed on one surface of the first substrate;
  a plurality of pixel electrodes formed on a surface of the second substrate and being opposite to the common electrode, each of the pixel electrodes including a slit and a first sub-pixel electrode and a second sub-pixel electrode which are electrically isolated to each other by the slit;
  a plurality of first switches and second switches, wherein each of the first switches is used for controlling corresponding first sub-pixel electrode, and each of the second switches is used for controlling corresponding second sub-pixel electrode; and
  liquid crystals (LCs) sealed between the first substrate and the second substrate;
  wherein by the strong electrical force corresponding to the fringe electrical field between the first and second sub-pixel electrodes, the first and second sub-pixel electrodes of one of the pixel electrodes incline the liquid crystals to different directions in the close proximity of the slit so as to create at least two domains when data signals of opposite polarities with respect to the voltage of the common electrode are respectively applied to the first sub-pixel electrode and the second sub-pixel electrode of the one of the pixel electrodes;
  wherein each pixel electrode corresponds to a pixel, each first sub-pixel electrode corresponds to a first sub-pixel and each second sub-pixel electrode corresponds to a second sub-pixel.

2. The LCD according to claim 1, further comprising a plurality of scan lines and data lines, one data line is electrically coupled to one column of the first sub-pixel electrodes or one column of the second sub-pixel electrodes.

3. The LCD according to claim 1, further comprising a plurality of scan lines and data lines, one scan line is electrically coupled to one row of the first sub-pixel electrodes or the second sub-pixel electrodes.

4. The LCD according to claim 1, wherein the LCD further comprises a storage capacitor electrode which is formed below the slit and is larger than the slit in width.

5. The LCD according to claim 1, wherein the LCD further comprises a storage capacitor electrode which is formed below the second sub-pixel electrode, the storage capacitor electrode is electrically coupled to the first sub-pixel electrode, and the storage capacitor electrode and the second sub-pixel electrode form a storage capacitor.

6. The LCD according to claim 1, wherein the LCD further comprises a first storage capacitor electrode and a second storage capacitor electrode which are formed below the second sub-pixel electrode and the first sub-pixel electrode respectively, the first storage capacitor electrode is electrically coupled to the first sub-pixel electrode, the second storage capacitor electrode is electrically coupled to the second sub-pixel electrode, the first storage capacitor electrode and the second sub-pixel electrode form a first storage capacitor, and the second storage capacitor electrode and the first sub-pixel electrode form a second storage capacitor.

7. The LCD according to claim 1, wherein the first sub-pixel electrodes in the same column are applied with data signals of a first electrical polarity and the second sub-pixel electrodes in the same column are applied with data signals of a second electrical polarity.

8. The LCD according to claim 1, wherein the first switch and the second switch are thin-film transistors (TETs).

9. A method of driving a multi-domain vertical alignment (MVA) liquid crystal display (LCD), the MVA LCD including a first substrate, a second substrate, a plurality of pixels, a plurality of first switches, and a plurality of second switches, and a common electrode, and liquid crystals, each pixel including a first sub-pixel electrode and a second sub-pixel electrode which are electrically isolated to each other by a slit, each first sub-pixel electrode and second sub-pixel electrode being controlled by the corresponding first switch and a second switch, the common electrode being formed on one surface of the first substrate, the first sub-pixel electrodes and second sub-pixel electrodes being formed on a surface of the second substrate and being opposite to the common electrode, the liquid crystals being sealed between the first substrate and the second substrate, the method comprising:

enabling each row of the first switches and the second switches; and applying corresponding data signals to the first sub-pixel electrodes and the second sub-pixel electrodes selectively when the corresponding first and second switches of the first sub-pixel electrodes and the second sub-pixel electrodes are enabled;

wherein the data signals applied to the first and second sub-pixel electrodes of one pixel are of different electrical polarities with respect to the common electrode, so that the fringe electrical field between the adjacent first and second sub-pixel electrodes of one pixel is enhanced, and the first sub-pixel electrode and the second sub-pixel electrode of one of the pixel incline the liquid crystals to different directions in the close proximity of the slit so as to create at least two domains;

wherein each first sub-pixel electrode corresponds to a first sub-pixel and each second sub-pixel electrode corresponds to a second sub-pixel.

10. The method according to claim 9, wherein the LCD further comprises a plurality of scan lines and data lines, one data line is electrically coupled to one column of the first switches or one column of the second switches, one scan line is electrically coupled to one row of first switches and one row of second switches, the method further comprising:

in the enabling step, selecting one scan line sequentially, and enabling the first and second switches which are electrically coupled to the selected scan line; and in the applying step, applying the corresponding data signals to the corresponding sub-pixel electrodes through the corresponding data lines;

wherein the data signals transmitted in the same data line are of the same polarity.

11. The method according to claim 9, wherein the LCD further comprises a plurality of scan lines and data lines, one scan line is electrically coupled to one row of the first switches or one row of the second switches, one data line is electrically coupled to one column of first switches and one column of second switches, the method further comprising:

in the enabling step, selecting one scan line sequentially, and enabling the first and second switches which are electrically coupled to the selected scan line; and in the applying step, applying the corresponding data signals to the corresponding sub-pixel electrodes through the corresponding data lines;

wherein the data signals transmitted in the same data line are of the same polarity.

12. The LCD according to claim 1, wherein the first sub-pixel and the second sub-pixel of one pixel are for displaying substantially the same gray level.

13. The method according to claim 9, wherein the first sub-pixel and the second sub-pixel of one pixel are for displaying substantially the same gray level.

* * * * *